Patented Sept. 27, 1949

2,483,219

UNITED STATES PATENT OFFICE 2,483,219

POLYALKYLATED MONOHYDROXY CYCLIC SULFONES

Rupert C. Morris and Norten C. Melchior, Berkeley, Calif., assignors to Shell Development Company, San Francisco, Calif., a corporation of Delaware No Drawing. Application May 4, 1946, Serial No. 667,483

12 Claims. (Cl. 260—329)

This invention relates to a novel and particularly useful class of compounds comprising the polyalkylated monohydroxy cyclic sulfones. More particularly, the invention pertains to polyalkylated monohydroxysulfolanes and polyalkylated monohydroxysulfolenes. A particularly valuable group of compounds comprises the monohydroxy-2,4-dialkyl sulfolanes and monohydroxy-2,4-dialkylsulfolenes.

The monohydroxy compounds of the invention comprise a five-membered heterocyclic nucleus consisting of four nuclear carbon atoms and a sulfonyl radical and have at least two alkyl radicals directly attached to one or more of the nuclear carbon atoms, and have one hydroxy radical directly attached to a saturated nuclear carbon atom.

The novel monohydroxy-polyalkylsulfolanes of the invention comprise a five-membered heterocyclic ring consisting of four saturated nuclear carbon atoms and a sulfonyl radical, have at least two alkyl radicals directly attached to one or more of the nuclear carbon atoms, and have one of the nuclear carbon atoms directly attached to a hydroxy radical, the remaining free bonds of the nuclear carbon atoms being directly attached to members of the group consisting of the hydrogen atom and organic radicals. The monohydroxy polyalkylsulfolanes may be represented by the formula

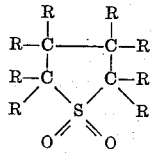

wherein one of the R's is the hydroxy radical, at least two of the R's are alkyl radicals, and the remaining R's are members of the group consisting of the hydrogen atom and the organic radicals.

The monohydroxy polyalkyl sulfolenes of the invention comprise a five-membered heterocyclic ring consisting of four nuclear carbon atoms and a sulfonyl radical, have a double bond between two vicinal nuclear carbon atoms, have at least two alkyl groups directly attached to one or more of the nuclear carbon atoms and one of the nuclear carbon atoms directly attached to the hydroxy radical, the remaining free bonds of the nuclear carbon atoms being directly attached to members of the group consisting of the hydrogen atom and the organic radicals. The monohydroxy polyalkylsulfolenes may be represented by the formulae

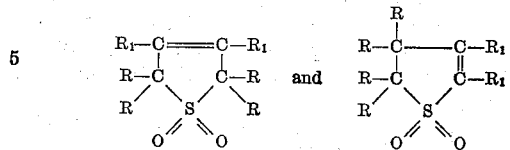

wherein one of the R's is the hydroxy radical, at least two of the radicals represented by R and/or $R_1$ are alkyl radicals, and the remaining R's and $R_1$'s are members of the group consisting of the hydrogen atom and the organic radicals.

A valuable group of polyalkylated monohydroxy cyclic sulfones of the invention comprises those compounds containing a five-membered heterocyclic ring consisting of four nuclear carbon atoms and a sulfonyl radical and having two alkyl radicals directly attached to two different nuclear carbon atoms, preferably in the 2- and the 4-positions, wherein one of the four nuclear carbon atoms is directly attached to the hydroxy radical and wherein the remaining free bonds of the nuclear carbon atoms are directly attached to hydrogen atoms.

The alkyl radicals which are directly attached to the cyclic sulfone nucleus are preferably lower alkyl radicals containing not more than four carbon atoms, i. e. the methyl, ethyl, propyl, isopropyl, n-butyl, sec-butyl and tert-butyl radicals. However, useful compounds are also formed wherein alkyl radicals containing more than four carbon atoms are directly attached to the cyclic sulfone nucleus. Examples of the higher alkyl radicals are amyl, hexyl, isoamyl, 2-methylamyl, heptyl, octyl, stearyl, and the like, preferably containing not more than 18 carbon atoms.

The other organic radicals which may be attached to the nuclear carbon atoms may be hydrocarbon radicals or substituted hydrocarbon radicals, such as the halogen-substituted hydrocarbon radicals. The organic radicals which R may represent may be cyclic or acyclic, saturated, unsaturated or aromatic, and include the alkyl, aryl, alkenyl, aralkyl, aralkenyl, alkenaryl, cycloalkyl, cycloalkenyl and heterocyclic radicals such as methyl, ethyl, propyl, isopropyl, butyl, isobutyl, sec-butyl, tert-butyl, amyl, hexyl, vinyl, allyl, methallyl, crotyl, butadienyl, phenyl, chloromethyl, chlorobutyl, chlorohexyl, chloroallyl, bromophenyl, chlorophenyl, bromostearyl, dichlorophenyl, pentachlorophenyl, xylyl, benzyl, styryl, cinnamyl, sulfolanyl, 2,4-dimethyl-3-sulfolanyl, sulfolenyl, furfuryl, tetrahydrofurfuryl, tetrahydrothiophenyl, cyclohexyl, 3,3,5-trimethyl-cyclohexyl, cyclohexenyl, 3,5,5-trimethyl-2-cyclohexenyl, 3,5,5-trimethyl-3-cyclohexeneyl, cyclopentadienyl, propargyl, and the like and their homologues. However, when R represents an organic radical, it is preferably a hydrocarbon radical, and more preferably a hydrocarbon radical of saturated character, i. e. not readily hydrogenatable, such as the alkyl, cycloalkyl, aryl, aralkyl and alkaryl radicals. Examples of the saturated hydrocarbon radicals include methyl, ethyl, propyl, isopropyl, butyl, isobutyl, sec-butyl, tert-butyl, cyclohexyl, cyclopropyl, phenyl, xylyl, benzyl, cresyl and 3,3,5-trimethyl-cyclohexyl.

Monohydroxy polyalkylsulfolanes and monohydroxy polyalkylsulfolenes having the hydroxy radical on the nuclear carbon atom in the 3- position and having an alkyl group on each of the nuclear carbon atoms in the 2- and 4-positions, possess unexpectedly valuable properties which make them of particular use in various industrial applications. An example of a particularly valuable 2,4-dialkyl-3-sulfolanol is 2,4-dimethyl-3-sulfolanol.

The numbering system of the sulfolane or sulfolene ring is indicated below:

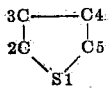

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure

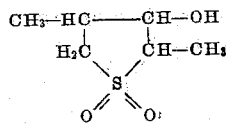

which is termed 2,4-dimethyl-3-sulfolanol or 3-hydroxy-2,4-dimethylsulfolane. The compound having the structure

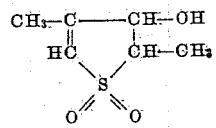

is termed 2,4-dimethyl-4-sulfolen-3-ol.

It has, surprisingly, been found that the novel compounds of the invention wherein the sulfolane or sulfolene nucleus has only one hydroxy radical directly attached to but one nuclear carbon atom and has at least two alkyl radicals directly attached to one or more nuclear carbon atoms, and particularly the 2,4-dialkylsulfolanols and 2,4-dialkylsulfolenols, possess inherent properties which are markedly superior to those of the dihydroxy cyclic sulfones such, for example, as 3,4-dimethyl-3,4-sulfolanediol and 2,4-di(tert-butyl)-3,4-sulfolanediol. These properties could not be foreseen, and they are of such a nature as to make the compounds of the invention particularly useful in various applications.

The monohydroxy polyalkylsulfolanes are prepared by treating the corresponding polyalkylsulfolene with an aqueous solution of a strong base such as potassium hydroxide, sodium hydroxide, or the like. For example, a 2,4-dialkyl-4-sulfolanol is prepared by treating the corresponding 2,4-dialkyl-3-sulfolene with an aqueous solution of sodium hydroxide at approximately room temperature, e. g. 2,4-dimethyl-3-sulfolene thus treated forms 2,4-dimethyl-4-sulfolanol. When a 3,4-dialkyl-3-sulfolene is treated with an aqueous caustic solution, a 3,4-dialkyl-3-sulfolanol is produced.

One particularly advantageous method of producing the monohydroxy polyalkylsulfolenes of the invention is by reaction of a polyalkyl sulfolene with hypohalogenous acid and dehydrohalogenation of the resulting monohydroxy polyalkyl halosulfone. Thus, for instance, a polyalkyl sulfolene may be treated at about $-10°$ C. to about 40° C., preferably at about room temperature, with a stoichiometric excess of an aqueous solution of hypochlorous acid. On completion of the reaction, the excess acid is neutralized and the product is treated with a stoichiometric excess of a base such as aqueous sodium hydroxide or pyridine or the like, the mixture being heated preferably to about 25° C. to about 100° C. to obtain the corresponding monohydroxy polyalkyl sulfolene. In this way, 4-hydroxy-2,4-dimethyl-2-sulfolene is obtained from 3-chloro-4-hydroxy-2,4-dimethylsulfolane produced from 2,4-dimethyl-3-sulfolene, and 4-hydroxy-2,5-diisopropyl-2-sulfolene is recovered in good yields from 3-chloro-4-hydroxy-2,5-diisopropylsulfolane readily obtained from 2,5-diisopropyl-3-sulfolene. In starting with 2-methyl-5-ethyl-3-sulfolene in this process, a mixture of 4-hydroxy-2-methyl-5-ethyl-2-sulfolene and 3-hydroxy-2-methyl-5-ethyl-4-sulfolene is obtained. While these isomers may be separated before use of the product, this is usually unnecessary as these compounds have very similar properties which make them generally equally useful in the applications to which the new compounds of the invention are adopted.

The monohydroxy polyalkyl sulfolanes of the invention may also be produced by catalytic hydrogenation of the corresponding monohydroxy polyalkyl sulfolenes prepared in the foregoing manner. Active nickel, particularly Raney nickel, at relatively low temperatures, for instance about 20° C. to 100° C., is an advantageous catalyst for this hydrogenation but other hydrogenation catalysts may also be used.

The novel polyalkylsulfolanols and polyalkylsulfolenols of the invention find utility in a large variety of industries. For example, they may be used as insecticides, fungicides and parasiticides, or as ingredients of insecticidal, fungicidal and parasiticidal compositions, and as ingredients for use in the manufacture of varnishes, polishes, and the like. The novel compounds may also be employed in the preparation of natural or synthetic rubbers, resins, plastics, etc., and as perfume fixatives and the like. Moreover, the polyalkylsulfolanols and the polyalkylsulfolenols may be further reacted, e. g. sulfurized, sulfated, esterified, or the like, to produce valuable substances to be used as addition agents in lubricating oils, greases, and as detergents, as well as for a variety of other purposes.

The following examples serve to illustrate the invention:

*Example I*

Approximately 146 parts by weight of 2,4-dimethyl-3-sulfolene was dissolved in about 3000 parts by weight of water, and to this solution was added about 494 parts by weight of 97.4% sodium hydroxide in 1000 parts by weight of water. The solution was stirred and allowed to stand at room temperature. The reaction mixture was neutralized with HCl, evaporated to dryness, the salt cake extracted with acetone, and the solvent subsequently evaporated. The residue was distilled under reduced pressure. The 2,4-dimethyl-4-sulfolanol recovered was found to have a boiling point of 183.4° C. at 5 mm. pressure, and to have a melting point of 91.7° C. to 92.6° C.

*Example II*

When a solution of about 174 parts by weight of 2,4-diethyl-3-sulfolene in about 3000 parts by weight of water is treated with about 494 parts by weight of 97.4% sodium hydroxide in 100 parts by weight of water, according to the procedure described in Example I, 2,4-diethyl-4-sulfolanol is produced in good yield.

*Example III*

3,4-dimethyl-3-sulfolene is treated with potassium hydroxide according to the process described in Example I to produce 3,4-dimethyl-3-sulfolanol.

Using the method of the foregoing examples, the following novel monohydroxy polyalkyl sulfolanols are obtained:

2,4-dipropyl-4-sulfolanol from 2,4-dipropyl-3-sulfolene
2-methyl-4-ethyl-4-sulfolanol from 2-methyl-4-ethyl-3-sulfolene
2,4-diisopropyl-4-sulfolanol from 2,4-diisopropyl-3-sulfolene
2,4-dibutyl-4-sulfolanol from 2,4-dibutyl-3-sulfolene
2,5-dimethyl-3-sulfolanol from 2,4-dimethyl-3-sulfolene
2,5-diethyl-3-sulfolanol from 2,4-diethyl-3-sulfolene
2-isopropyl-5-butyl-4-sulfolanol and 2-isopropyl-5-butyl-5-sulfolanol from 2-isopropyl-5-butyl-3-sulfolene
3,4-diisobutyl-3-sulfolanol from 3,4-diisobutyl-3-sulfolene
3,4-diethyl-3-sulfolanol from 3,4-diethyl-3-sulfolene
2,4-dimethyl-2-sulfolanol from 2,4-dimethyl-2-sulfolene
2,5-dicyclohexyl-2-sulfolanol from 2,5-dicyclohexyl-2-sulfolene
3,4-di(secondary butyl)-3-sulfolanol from 3,4-di(secondary butyl)-2-sulfolene
2,4,5-trimethyl-4-sulfolanol from 2,4,5-trimethyl-3-sulfolene
2,3,5-tri(tert. butyl)-3-sulfolanol from 2,3,5-tri(tert. butyl)-3-sulfolene
2-methyl-3,5-diethyl-5-sulfolanol from 2-methyl-3,5-diethyl-4-sulfolene
2,2,4-trimethyl-4-sulfolanol from 2,2,4-trimethyl-3-sulfolene
2,2,4-triethyl-4-sulfolanol from 2,2,4-triethyl-3-sulfolene
2,2,4,5-tetramethyl-4-sulfolanol from 2,2,4,5-tetramethyl-3-sulfolene In the same way, 2-methyl-5-phenyl-2-sulfolanol is produced from 2-methyl-5-phenyl-2-sulfolene, 2-chloromethyl-4-cyclohexyl-4-sulfolanol is obtained from 2-chloromethyl-4-cyclohexyl-3-sulfolene and a mixture of 2-benzyl-5-styryl-3-sulfolanol and 2-benzyl-5-styryl-4-sulfolanol is produced when 2-benzyl-5-styryl-3-sulfolene is used as the starting compound.

*Example IV*

Into a solution of 30 parts by weight of 2,4-dimethyl-3-sulfolene in approximately 800 parts by weight of water, about 18 parts by weight of chlorine was bubbled while stirring and maintaining the temperature between about 40° C. and about 50° C. When addition of the chlorine was complete, the reaction mixture was evaporated by warming under reduced pressure and subsequently distilled to obtain a good yield of 2,4-dimethyl-3-chloro-4-sulfolanol boiling between 160° C. and 163° C. under 2mm. Hg. The 2,4-dimethyl-3-chloro-4-sulfolanol obtained is dehydrochlorinated by slowly adding it to pyridine at about 25° C. The resulting 2,4-dimethyl-2-sulfolen-4-ol is recovered by neutralizing the reaction mixture with hydrogen chloride, evaporation of the neutralized mixture to dryness, and extraction of the residue with acetone. The 2,4-dimethyl-2-sulfolen-4-ol obtained after removal of the solvent may be recrystallized from ether.

Hydrogenation of the 2,4-dimethyl-2-sulfolen-4-ol in the presence of Raney nickel or platinum catalyst at about 25° C. under 20–30 pounds of hydrogen pressure gives the 2,4-dimethyl-4-sulfolanol obtained in Example I.

By the method of Example IV using either aqueous sodium or potassium hydroxide or pyridine as the base, other new monohydroxy polyalkyl sulfolenes are obtained by the use of the indicated different starting materials: 2,5-dimethyl-2-sulfolen-4-ol from 2,5-dimethyl-3-chloro-4-sulfolanol obtained from 2,5-dimethyl-3-sulfolene; 2,3-dimethyl-4-sulfolen-3-ol from 2,3-dimethyl-4-chloro-3-sulfolanol obtained from 2,3-dimethyl-3-sulfolene; 3,4-dimethyl-2-sulfolen-4-ol from 3,4-dimethyl-3-chloro-4-sulfolanol obtainable from 3,4-dimethyl-3-sulfolene; 2-methyl-4-ethyl-3-sulfolen-2-ol from 2-methyl-4-ethyl-3-chloro-2-sulfolanol obtainable from 2-methyl-4-ethyl-2-sulfolene; 2,5-dipropyl-3-sulfolen-2-ol from 2,5-dipropyl-3-chloro-2-sulfolanol obtainable from 2,5-dipropyl-2-sulfolene; 2,3,5-trimethyl-4-sulfolen-3-ol from 2,3,5-trimethyl-3-chloro-4-sulfolanol obtained from 2,3,5-trimethyl-3-sulfolene; and 2,3,4-trimethyl-2-sulfolen-4-ol and 2,3,4-trimethyl-4-sulfolen-3-ol from the chlorohydrins of 2,3,4-trimethyl-3-sulfolene.

The same method of dehydrochlorination applied to 3-methyl-4-ethyl-3-chloro-2-sulfolanol gives 3-methyl-4-ethyl-3-sulfolen-2-ol, and with 3-ethyl-5-methyl-3-chloro-2-sulfolanol gives 3-ethyl-5-methyl-3-sulfolen-2-ol. In the same way 2,3-diisopropyl-3-sulfolen-5-ol is obtained from 2,3-diisopropyl-4-chloro-5-sulfolanol and 2,3-dimethyl-3-sulfolen-2-ol is obtained from 2,3-dimethyl-3-chloro-2-sulfolanol and 2,3-diethyl-2-sulfolen-5-ol is produced from 2,3-diethyl-3-chloro-5-sulfolanol.

Still other novel monohydroxy polyalkyl sulfolanes and sulfolenes which may be prepared include, for instance, 2,4-dimethyl-3-sulfolanol, 2,4-diethyl-3-sulfolanol, 3,4-dimethyl-2-sulfolanol, 2-isopropyl-4-butyl-3-sulfolanol, 2,4-dimethyl-2-sulfolen-5-ol and 2,4-diisopropyl-2-sulfolen-5-ol.

We claim as our invention:

1. A compound containing a five-membered heterocyclic nucleus consisting of four nuclear carbon atoms and one sulfonyl radical wherein at least two of the nuclear carbon atoms of said heterocyclic nucleus are directly attached to alkyl radicals and wherein one of the nuclear carbon atoms of said heterocyclic nucleus is directly attached to the hydroxy radical, the remaining free bonds of the nuclear carbon atoms of said heterocyclic nucleus being directly attached to members of the group consisting of the hydrogen atom and the hydrocarbon radicals.

2. A compound containing a five-membered heterocyclic nucleus consisting of four nuclear carbon atoms and one sulfonyl radical wherein each of two nuclear carbon atoms of said heterocyclic nucleus is directly attached to an alkyl radical and wherein one of the nuclear carbon atoms of said heterocyclic nucleus is directly attached to the hydroxy radical, the remaining free bonds of the nuclear carbon atoms of said heterocyclic nucleus being directly attached to hydrogen atoms.

3. A compound containing a five-membered heterocyclic nucleus consisting of four saturated nuclear carbon atoms and one sulfonyl radical wherein each of the nuclear carbon atoms in the 2- and 4-positions of said heterocyclic nucleus is directly attached to an alkyl radical and wherein one of the nuclear carbon atoms of said heterocyclic nucleus once removed from the sulfonyl radical thereof is linked directly to the hydroxy radical, the remaining free bonds of the nuclear carbon atoms being directly attached to the hydrogen atoms of said heterocyclic nucleus.

4. 2,4-dimethyl-3-sulfolanol of the formula

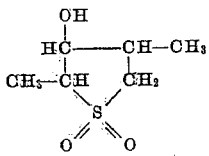

5. 2,4-dimethyl-4-sulfolanol of the formula

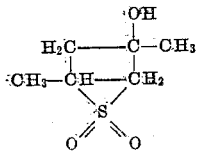

6. A compound containing a five-membered heterocyclic nucleus consisting of four nuclear carbon atoms and one sulfonyl radical and containing an olefinic linkage between two vicinal nuclear carbon atoms, wherein two of the nuclear carbon atoms of said heterocyclic nucleus are directly attached to alkyl radicals and wherein one of the nuclear carbon atoms of said heterocyclic nucleus is linked directly to the hydroxy radical, the remaining free bonds of the nuclear carbon atoms of said heterocyclic nucleus being directly attached to hydrogen atoms.

7. A compound containing a five-membered heterocyclic nucleus consisting of four nuclear carbon atoms and one sulfonyl radical and containing a double bond between the two nuclear carbon atoms once removed from the sulfonyl radical of said heterocyclic nucleus, wherein each of the nuclear carbon atoms in the 2- and the 4-positions of said heterocyclic nucleus is directly attached to an alkyl radical and wherein a nuclear carbon atom directly linked to said sulfonyl radical of said heterocyclic nucleus is directly attached to the hydroxy radical, the remaining free bonds of the nuclear carbon atoms of said heterocyclic nucleus being directly linked to hydrogen atoms.

8. 2,4-dimethyl-2-sulfolen-4-ol of the formula

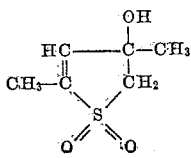

9. A process for the production of a 2,4-dialkyl-4-sulfolanol of the formula

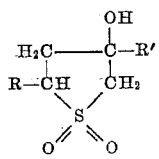

wherein R and R' represent alkyl radicals of not more than 4 carbon atoms which comprises reacting a 2,4-dialkyl-3-sulfolene of the formula

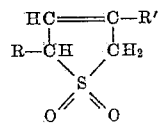

wherein R and R' represent alkyl radicals of not more than 4 carbon atoms in an aqueous caustic solution.

10. A process for the production of 2,4-dimethyl-4-sulfolanol of the formula

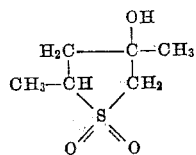

which comprises treating 2,4-dimethyl-3-sulfolene of the formula

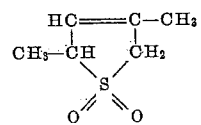

with an aqueous solution of sodium hydroxide at a temperature of about 25° C.

11. A 2,4-dialkyl-4-sulfolanol of the formula

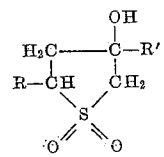

wherein R and R' represent alkyl radicals of not more than 4 carbon atoms.

12. A compound containing a five-membered heterocyclic nucleus consisting of four nuclear carbon atoms and one sulfonyl radical wherein at least two alkyl radicals having not more than four carbon atoms are directly attached to said heterocyclic nucleus and wherein one of the nuclear carbon atoms of said heterocyclic nucleus is directly attached to the hydroxy radical, the remaining free bonds of the nuclear carbon atoms of said heterocyclic nucleus being directly attached to members of the group consisting of the hydrogen atom and the hydrocarbon radicals.

RUPERT C. MORRIS.
NORTEN C. MELCHIOR.

REFERENCES CITED

The following references are of record in the file of this patent:

UNITED STATES PATENTS

| Number | Name | Date |
| --- | --- | --- |
| 2,189,367 | Muth | Feb. 6, 1940 |
| 2,393,925 | Morris et al. | Jan. 29, 1946 |